(12) United States Patent
Raju et al.

(10) Patent No.: US 10,574,459 B2
(45) Date of Patent: Feb. 25, 2020

(54) CODE SIGNING SERVICE

(71) Applicant: Microsoft Technology Licensing, LLC, Redmond, WA (US)

(72) Inventors: Prabu Raju, Kirkland, WA (US); Fengfen Liu, Seattle, WA (US); Christopher Leonard Walstad, Seattle, WA (US); Levi P. Broderick, Bothell, WA (US); Himanshu Soni, Bothell, WA (US); Reed Molbak, San Francisco, WA (US); Klaudia Leja, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 32 days.

(21) Appl. No.: 14/871,741

(22) Filed: Sep. 30, 2015

(65) Prior Publication Data
US 2017/0093575 A1   Mar. 30, 2017

(51) Int. Cl.
*H04L 9/32* (2006.01)
*H04L 9/08* (2006.01)
*H04L 29/06* (2006.01)

(52) U.S. Cl.
CPC ............ *H04L 9/321* (2013.01); *H04L 9/0861* (2013.01); *H04L 9/0897* (2013.01); *H04L 9/3247* (2013.01); *H04L 63/08* (2013.01)

(58) Field of Classification Search
CPC ....................................................... H04L 9/321
See application file for complete search history.

(56) References Cited

U.S. PATENT DOCUMENTS

| | | | |
|---|---|---|---|
| 6,898,707 B1 | 5/2005 | Sit et al. | |
| 7,143,165 B2 | 11/2006 | Vogel et al. | |
| 7,522,732 B2 * | 4/2009 | Whitehead | G06F 21/121 380/286 |
| 7,743,248 B2 | 6/2010 | Bisbee et al. | |
| 8,312,518 B1 | 11/2012 | Ezell et al. | |
| 9,332,002 B1 * | 5/2016 | Bowen | H04L 63/0823 |
| 2004/0243852 A1 * | 12/2004 | Rosenstein | G06F 21/606 726/4 |

(Continued)

FOREIGN PATENT DOCUMENTS

WO    2015009231 A1    1/2015

OTHER PUBLICATIONS

"International Search Report & Written Opinion Issued in PCT Application No. PCT/US2016/054259," dated Mar. 15, 2017, 15 Pages.

(Continued)

*Primary Examiner* — Jeffrey Nickerson
*Assistant Examiner* — Thanh H Le
(74) *Attorney, Agent, or Firm* — Fountainhead Law Group P.C.

(57) ABSTRACT

A facility for enrolling a software implementer in a code signing. In one example facility, the facility receives information identifying the implementer, and credentials authenticating the implementer. The facility generates secret state for the implementer. Based on at least one or both of (1) at least a portion of the received credentials and (2) at least a portion of the generated secret state, the facility generates for the implementer a key pair comprising a private key and a public key, and persistently stores the secret state.

26 Claims, 15 Drawing Sheets

(56) References Cited

U.S. PATENT DOCUMENTS

| | | | |
|---|---|---|---|
| 2006/0075222 A1 | 4/2006 | Moloney et al. | |
| 2006/0264202 A1* | 11/2006 | Hagmeier | H04L 63/0823 |
| | | | 455/411 |
| 2009/0249071 A1* | 10/2009 | De Atley | G06F 21/6218 |
| | | | 713/171 |
| 2010/0037068 A1* | 2/2010 | Murase | G06F 21/6209 |
| | | | 713/193 |
| 2012/0204032 A1* | 8/2012 | Wilkins | H04L 9/006 |
| | | | 713/170 |
| 2013/0086387 A1 | 4/2013 | Fulton et al. | |
| 2016/0164677 A1* | 6/2016 | Holm | H04L 9/3247 |
| | | | 713/171 |

OTHER PUBLICATIONS

"Second Written Opinion Issued in PCT Application No. PCT/US2016/054259", dated Jun. 27, 2017, 8 Pages.

"International Preliminary Report on Patentability Issued in PCT Application No. PCT/US2016/054259", dated Sep. 22, 2017, 10 Pages.

"Office Action Issued in European Patent Application No. 16778632.6", dated Aug. 12, 2019, 6 Pages.

\* cited by examiner

FIG. 5

| implementer table 500 | | | | |
|---|---|---|---|---|
| implementer identity | implementer credentials | implementer secret state | implementer private key | implementer public key |
| Acme Utilities | $A_1$ | $B_1$ | $C_1$ | $D_1$ |
| Macabre Games | $A_2$ | $B_2$ | $C_2$ | $D_2$ |
| 511 | 512 | 513 | 514 | 515 |

501, 502

| implementer table ~1200 | | | | |
|---|---|---|---|---|
| implementer identity | implementer credentials | implementer secret state | implementer private key | implementer public key |
| Acme Utilities | $A_1$ | $B_1'$ | $C_1'$ | $D_1'$ |
| Macabre Games | $A_2$ | $B_2$ | $C_2$ | $D_2$ |
| ~1211 | ~1212 | ~1213 | ~1214 | ~1215 |

*FIG. 12*

| implementer identity | implementer secret state | implementer public key |
|---|---|---|
| Acme Utilities | $B_1$ | $D_1$ |
| Macabre Games | $B_2$ | $D_2$ | implementer table ⟵ 1400
1401, 1402
1411, 1413, 1415

FIG. 14

CODE SIGNING SERVICE

BACKGROUND

It is common for companies and other organizations producing computer software ("software implementers," or simply "implementers") to apply cryptographic signatures to their software's code. Those who receive code signed in this way can verify the signature, and by doing so confirm that (1) the implementer is the source of the code, and (2) the code is unchanged from when it left the implementer's control, and thus hasn't been manipulated to produce incorrect results, compromise the security of computer systems on which it runs, etc. In some cases, computer systems are configured to install only code having verified signatures by implementers in a list of trusted organizations.

The cryptographic signatures used for this purpose typically involve an asymmetric key pair generated for the implementer. The key pair includes a private key that the implementer uses to produce cryptographic signatures and keeps secret, and a corresponding public key that is published on the implementer's behalf to enable others to verify signatures purportedly made by the implementer.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for enrolling a software implementer in a code signing. In one example facility, the facility receives information identifying the implementer, and credentials authenticating the implementer. The facility generates secret state for the implementer. Based on at least one or both of (1) at least a portion of the received credentials and (2) at least a portion of the generated secret state, the facility generates for the implementer a key pair comprising a private key and a public key, and persistently stores the secret state.

BRIEF DESCRIPTION OF THE DRAWINGS

FIG. 5 is a table diagram showing sample contents of an implementer table used by the facility in some examples to store information about each registered software implementer.

FIG. 12 is a table diagram showing sample contents of an implementer table used by the facility in some examples after being updated in response to an implementer's key roll request.

FIG. 14 is a table diagram showing sample contents of an implementer table used by the additional example of the facility in some examples to store information about each registered software implementer.

DETAILED DESCRIPTION

Figure 1:
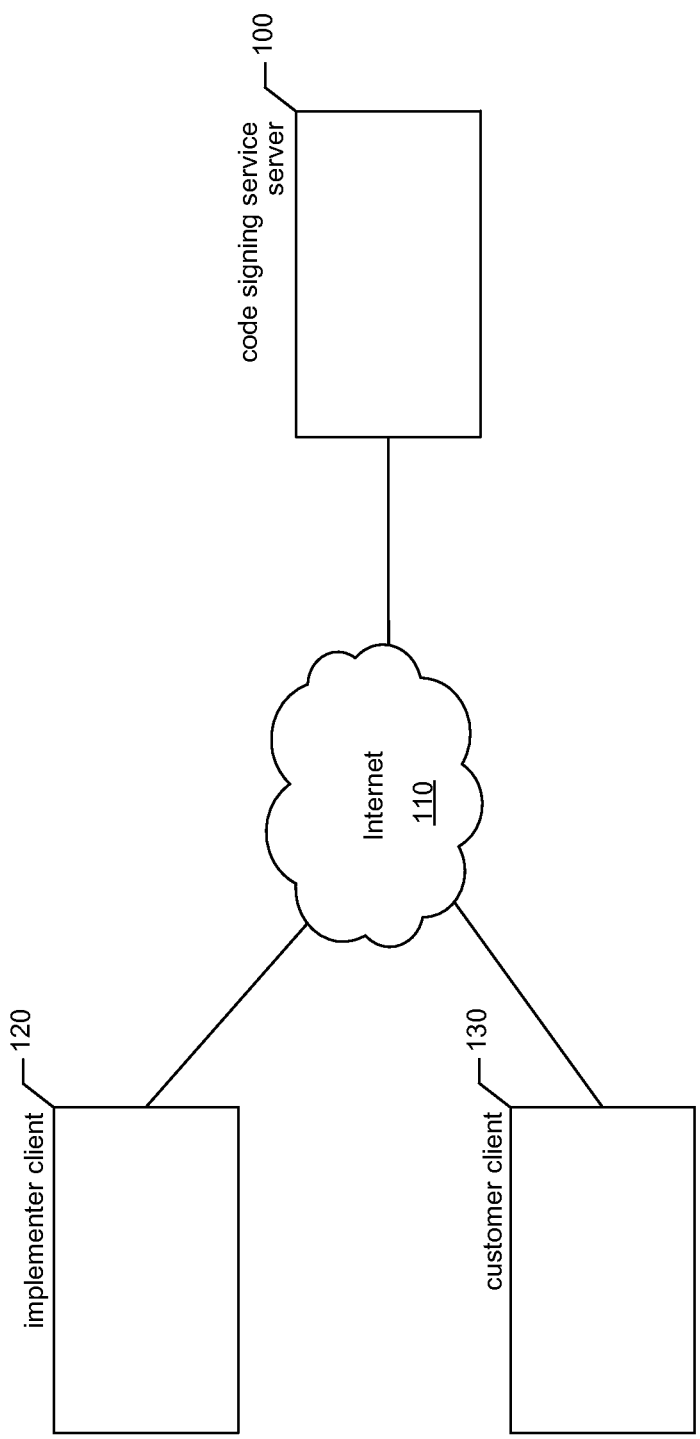
FIG. 1 is a network diagram showing a sample environment in which the facility operates in some examples.

The inventors have identified significant disadvantages with conventional approaches to signing code. In particular, the inventors have recognized that, by making each implementer organization responsible for its own private key, conventional approaches impose significant time and/or cost burdens on each organization to store its private key in a way that ensures its future availability; and appropriately and effectively control access to the key and its use to sign code so that it isn't used to sign unauthorized code.

In order to overcome these disadvantages, the inventors have conceived and reduced to practice a software and/or hardware facility for providing online service for signing code on behalf of implementer organizations ("the facility"). The facility manages each implementer's keys, and frees the implementers from having to do so.

In some examples, for each of a number of implementers, the facility generates a key pair for the implementer based in part upon credentials provided by the implementer, and also in part upon secret state maintained by the facility for the implementer. In a variety of examples, the facility uses credentials of a variety of types, including credentials based upon the OAuth authentication and authorization protocol described at oauth.net. In some examples, the facility securely stores at least the private key of the key pair for later use to sign code on behalf of the implementer; in some such examples, the key generation process used by the facility includes a random element so as to be nondeterministic. In some examples, the facility omits to store the implementer's private key; rather, it uses a deterministic key generation process, and regenerates the private key from the implementer's credentials and its secret state for the implementer each time the private key is needed to sign code on behalf of the implementer. In some examples, the facility takes steps to publish each implementer's public key, such as by transmitting it to a public key repository or registrar that responds to unauthenticated requests to retrieve an implementer's public key, operating its own public key repository, etc.

In some examples, the facility receives from an implementer its credentials, together with a representation of code to be signed. In various examples, this code representation is (1) the entire body of code to be distributed; (2) a catalog characterizing the body of code to be distributed, such as by comprising a collection of digests on various files present in one or more application or other unit of software; (3) one or more digests generated for the body of code to be distributed; or (4) a representation of another type that can be deterministically or semi-deterministically generated based on the body of code to be distributed. The facility uses the private key stored or regenerated for the implementer to sign the code representation, and returns the signed representation or the signature alone to the implementer. In approaches other than (1) above, the facility operates without access to the body of code itself, which may be regarded as a security advantage by some implementers.

In some examples, an implementer can instruct the facility to "roll" its key pair, i.e., to replace its key pair with a new one. Where the facility receives such an instruction from an implementer, it alters its secret state for the implementer; generates a new key pair for the implementer; publishes the public key of the new key pair; and, in examples where it persistently stores each implementer's private key rather than regenerating it when needed, stores the private key of the new key pair. In some examples, the facility automatically rolls some or all implementers' keys, such as periodically.

In a variety of examples, the facility signs data that accompanies code; data that, while separate from code, relates to code; and/or data that does not relate to code. For example, in some examples, the facility signs a code integrity policy file constituting a manifest of approved software publishers whose software is authorized to execute on a computer system.

In some examples, the facility performs timestamping as part of and/or separately from signing. In some examples, the facility responds to implementer requests to revoke a key pair. In some examples, the facility maintains an audit log, either alone or together with an interface that an implementer may use to determine what code representations or other payloads have been submitted on the implementer's behalf and signed with its private key.

By performing in some or all of the ways described above, the facility enables an implementer to enjoy the benefits of code signing without having to itself maintain a private key storage and code signing infrastructure.

FIG. 1 is a network diagram showing a sample environment in which the facility operates in some examples. A code signing service server 100 is accessed via the Internet 110 by both implementer client computer systems 120 and customer client computer systems 130. In various examples, the code signing service center registers an implementer using an implementer client (see FIGS. 3-5); signs code on behalf of an implementer using an implementer client (see FIGS. 6-7); provides an implementer public key to a customer using a customer client (see FIGS. 8-9); and changes, or "rolls," an implementer's key pair in response to a request from an implementer using an implementer client (see FIGS. 10-12).

While various examples are described in terms of the environment described above, those skilled in the art will appreciate that the facility may be implemented in a variety of other environments including a single, monolithic computer system, as well as various other combinations of computer systems or similar devices connected in various ways. In various examples, a variety of computing systems or other different client devices may be used in place of the web client computer systems, such as mobile phones, personal digital assistants, televisions, cameras, etc.

Figure 2:
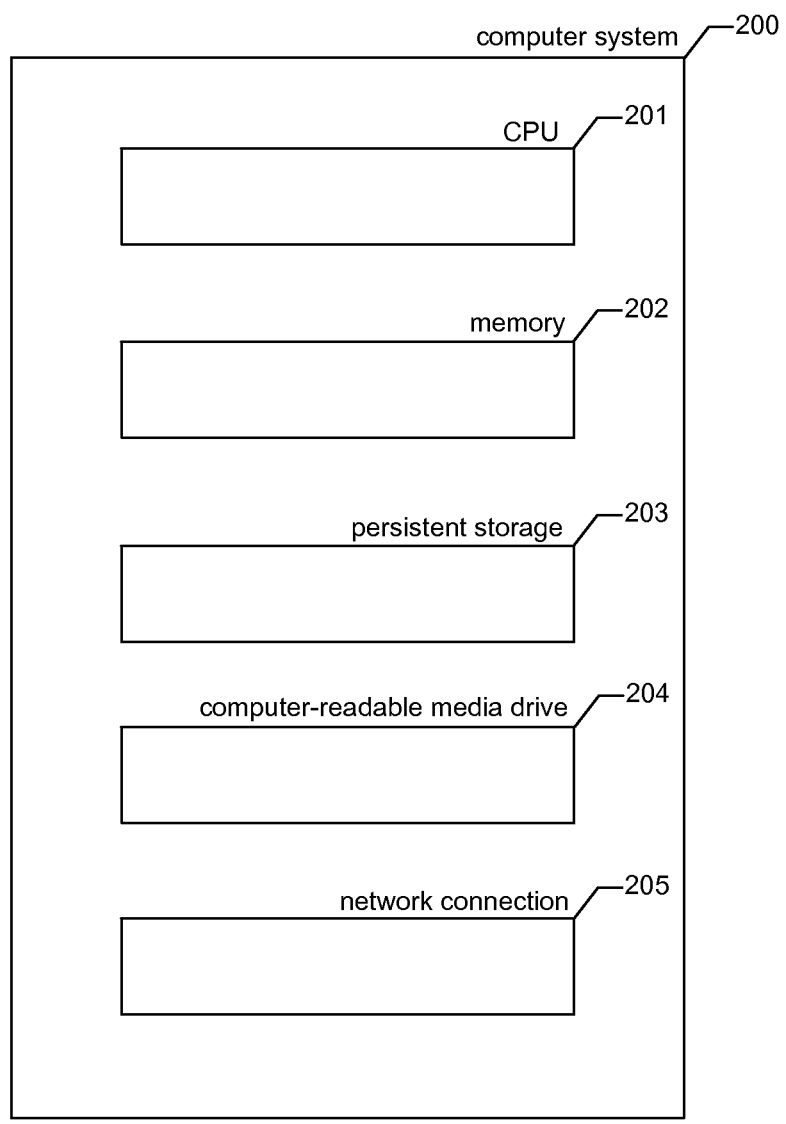
FIG. 2 is a block diagram showing some of the components that may be incorporated in at least some of the computer systems and other devices on which the facility operates.

FIG. 2 is a block diagram showing some of the components that may be incorporated in at least some of the computer systems and other devices on which the facility operates. In various examples, these computer systems and other devices 200 can include server computer systems, desktop computer systems, laptop computer systems, tablet computer systems, netbooks, mobile phones, personal digital assistants, televisions, cameras, automobile computers, electronic media players, electronic kiosk devices, electron table devices, electronic whiteboard devices, etc. In various examples, the computer systems and devices include zero or more of each of the following: a central processing unit ("CPU") 201 for executing computer programs; a computer memory 202 for storing programs and data while they are being used, including the facility and associated data, an operating system including a kernel, and device drivers; a persistent storage device 203, such as a hard drive or flash drive for persistently storing programs and data; a computer-readable media drive 204, such as a floppy, CD-ROM, or DVD drive, for reading programs and data stored on a computer-readable medium; and a network connection 205 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 3:
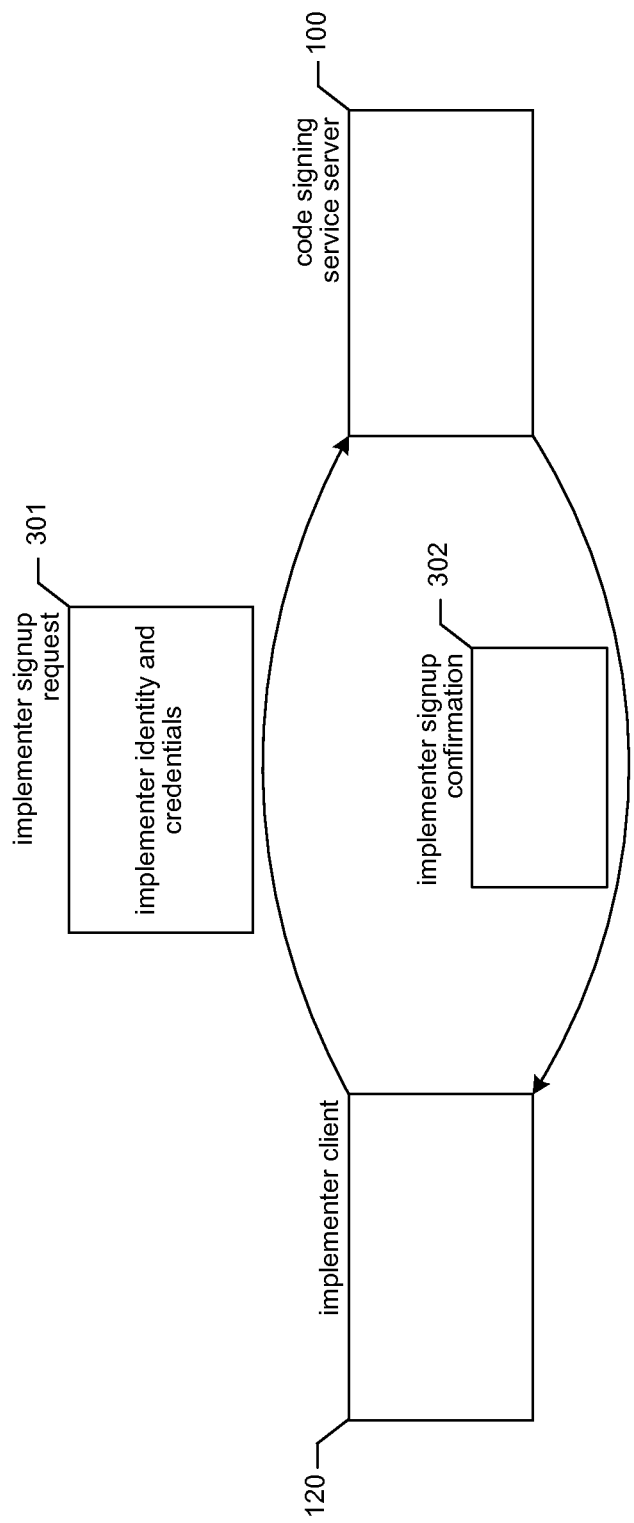
FIG. 3 is a data flow diagram showing sample interactions performed in accordance with the facility in some examples to register a new implementer.

FIG. 3 is a data flow diagram showing sample interactions performed in accordance with the facility in some examples to register a new implementer. An implementer client 120 operated by an implementer transmits to the code signing service server 100 an implementer signup request 301. The implementer signup request contains information identifying the implementer, as well as credentials authenticating the implementer's identity. In various examples, implementers provide various kinds of credentials including, in some examples, OAuth credentials. In response, the code signing service server registers the implementer as discussed below in connection with FIG. 4, and returns to the implementer client an implementer signup confirmation 302 confirming that the implementer has been registered with the code signing service.

Figure 4:
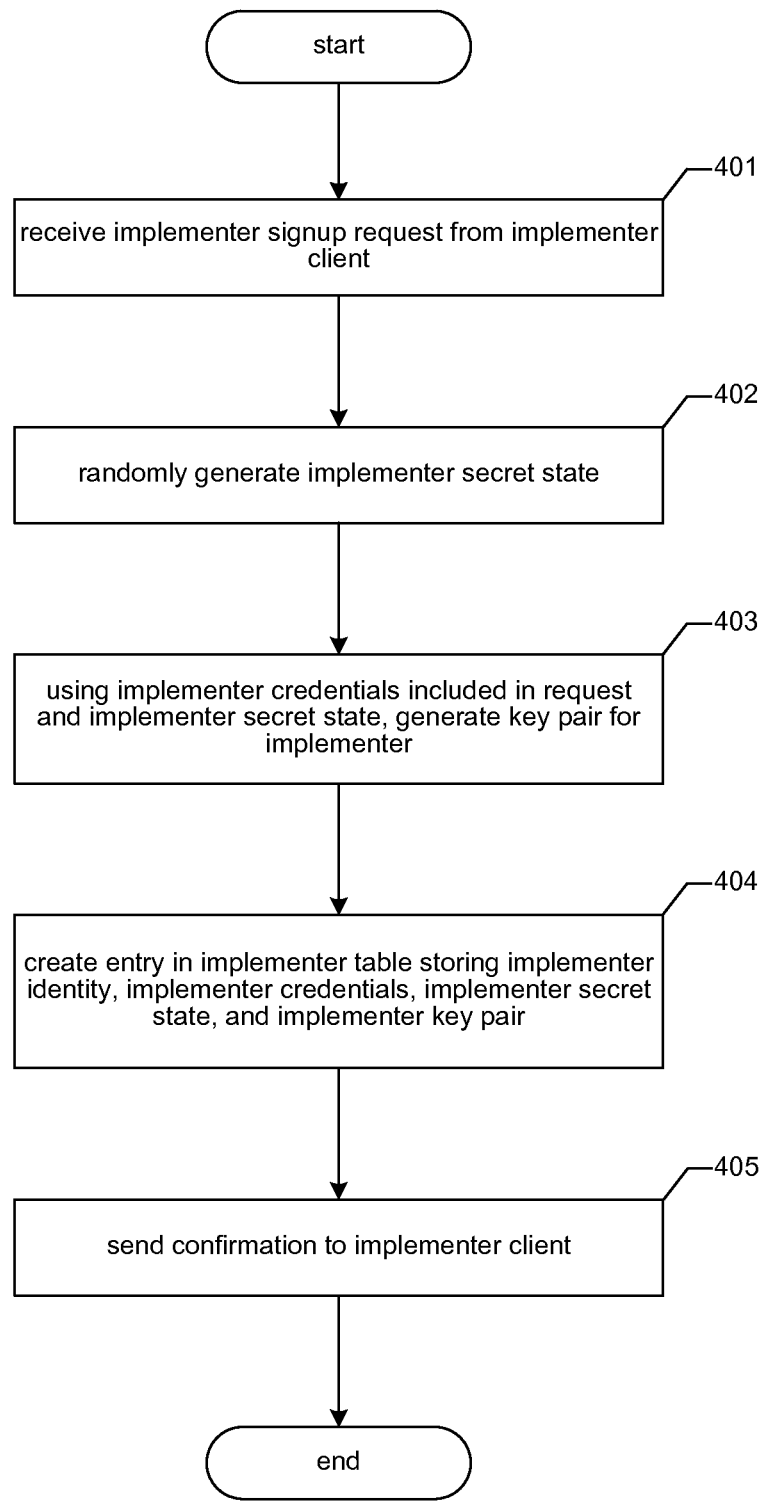
FIG. 4 is a flow diagram showing example acts that may be performed by the facility in some examples to process an implementer signup request.

FIG. 4 is a flow diagram showing example acts that may be performed by the facility in some examples to process an implementer signup request. At 401, the facility receives an implementer signup request from an implementer client computer system. At 402, the facility randomly generates a secret state that it maintains on behalf of the implementer. In some examples, the facility protects this implementer secret state from exposure beyond the boundaries of the code signing service. At 403, the facility uses some or all of the implementer credentials included in the implementer signup request received at 401, together with the implementer secret state generated at 402, to generate for the implementer a key pair including both a private key and a public key. In various embodiments, various other kinds of asymmetric key pairs or asymmetric key collection schemes are used. In some embodiments, the generation of the key pair at 403 is deterministic based upon the implementer credentials, the implementer secret state, and optionally other invariant bases; in some examples, the generation at 403 is nondeterministic, including one or more variant, random, and/or unpredictable bases. At 404, as illustrated in FIG. 5 discussed below, the facility creates a new entry in an implementer table. In this new entry, the facility stores information identifying the implementer, some or all of the implementer credentials, the secret state created for the implementer at 402, and the key pair generated for the implementer at 403. In some examples (not shown), the facility omits to store the implementer credentials and/or the implementer private key. In some examples, before storing the implementer private key, the facility encrypts the implementer private key using some or all of the implementer credentials, or in a manner that does not involve using implementer credentials, such as using an encryption key provided by a hardware security module or that is otherwise tied to the local environment; in some such examples, the facility omits to store the implementer credentials. At 405, the facility sends a confirmation to the implementer client that the implementer has been registered. After 405, these acts conclude.

Those skilled in the art will appreciate that the steps shown in FIG. 4 and in each of the flow diagrams discussed below may be altered in a variety of ways. For example, the order of the steps may be rearranged; some steps may be performed in parallel; shown steps may be omitted, or other steps may be included; a shown step may be divided into substeps, or multiple shown steps may be combined into a single step, etc.

FIG. 5 is a table diagram showing sample contents of an implementer table used by the facility in some examples to store information about each registered software implementer. The implementer table 500 is made up of rows, such as rows 501 and 502, each corresponding to a different registered implementer. Each row is divided into the following columns: an implementer identity column 511 containing information identifying the implementer to which the row corresponds; implementer credentials column 512 containing implementer credentials used to authenticate the implementer to which the row corresponds; implementer secret state column 513 containing a secret state used by the facility to generate keys for the implementer to which the row corresponds; implementer private key column 514 containing the private key generated by the facility for the implementer to which the row corresponds; and implementer public key column 515 containing the public key generated by the facility for the implementer to which the row corresponds. For example, row 501 indicates that the implementer Acme Utilities has implementer credentials $A_1$, implementer secret state $B_1$, implementer private key $C_1$, and implementer public key $D_1$.

In some examples, the facility takes additional measures to secure the contents of the implementer table and/or other states it uses in providing the service. For example, in some examples, the facility encrypts persistently-stored versions of such state using keys stored in a manner that physically and communicatively isolates them from the computer system or systems on which the facility runs, and/or from all other network-connected computing systems, or all other computer systems. These keys can be physically retrieved from their isolation if needed when unencrypted copies of the state stored in volatile memory are lost, such as in a crash or a service migration. In some examples, passwords or other credentials needed to initialize the operation of the computing systems on which the facility executes are similarly isolated.

While FIG. 5 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

Figure 6:
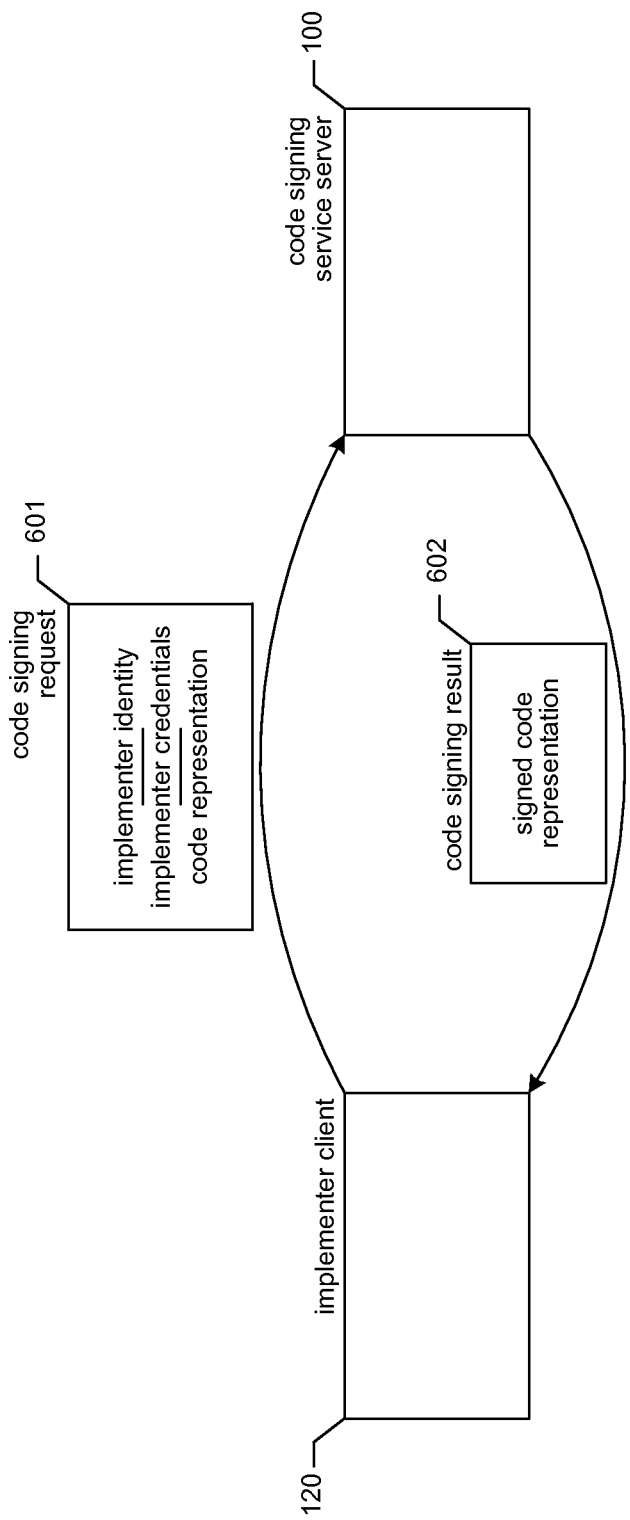
FIG. 6 is a data flow diagram showing interactions performed in accordance with the facility in some examples to find code on behalf of an implementer.

FIG. 6 is a data flow diagram showing interactions performed in accordance with the facility in some examples to find code on behalf of an implementer. An implementer client 120 operated by an implementer transmits to the code signing service server 100 to code signing request 601. The code signing request 601 contains information identifying the implementer, credentials authenticating the implementer's identity, and a code representation to be signed. As noted above, this code representation can be an entire body of code that is to be distributed; a catalog characterizing the body of code to be distributed; one or more digests generated for the body of code to be distributed, such as by comprising a collection of digests on various files present in one or more application or other unit of software; or a representation of another type. In response, the code signing server verifies the implementer credentials contained by the code signing request, and uses the implementer's private key to sign the code representation. In some examples, this involves retrieving the implementer's private key from the implementer table maintained by the facility, in some cases using the implementer credentials to decrypt the implementer private key. In some examples, this involves regenerating the implementer private key using the implementer credentials received and the implementer secret state maintained by the facility. The code signing service server returns to the implementer client a code signing result 602 containing a signed copy of the code representation. In some examples (not shown), rather than returning the code representation with the signature as shown, the code signing service server returns only the signature, which the implementer client can combine with the code representation that it included in the code signing request. After receiving the code signing result, the implementer client can make it available in connection with the body of code to which the code representation corresponds, such as by distributing it along with the body of code, making it available for customer retrieval when assessing or installing the body of code, etc.

Figure 7:
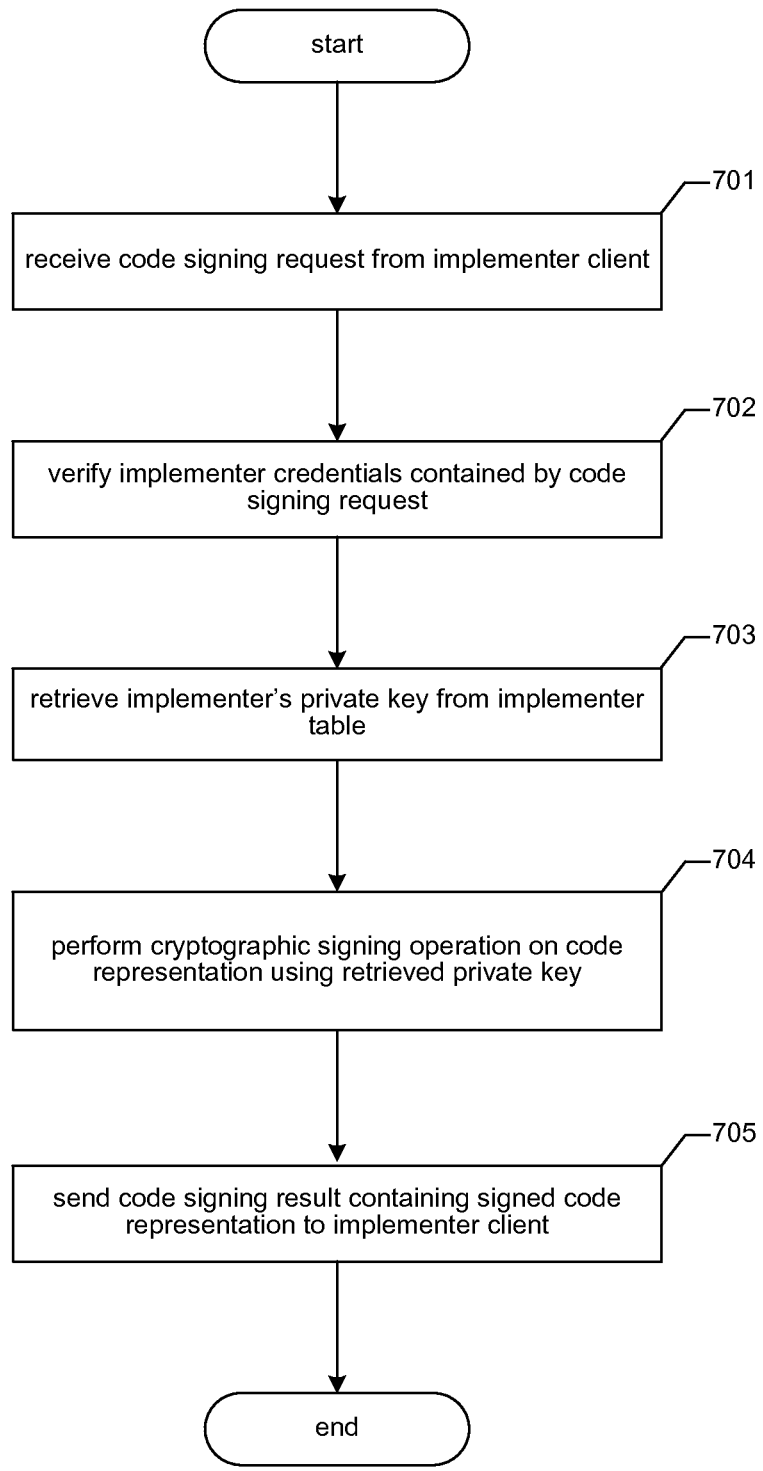
FIG. 7 is a flow diagram showing example acts that may be performed by the facility in some examples to process a code signing request.

FIG. 7 is a flow diagram showing example acts that may be performed by the facility in some examples to process a code signing request. At 701, the facility receives the code signing request from an implementer client computer system. At 702, the facility verifies the implementer credentials contained by the code signing request. At 703, the facility retrieves the implementer's private key from the implementer table. In some examples, where the version of the implementer's private key stored in the implementer table is encrypted with implementer credentials, the facility uses the implementer credentials contained by the code signing request to decrypt the implementer's private key. In examples in which a version of the implementer's private key is not stored in the implementer table, the facility regenerates the implementer's private key based upon the implementer credentials contained by the code signing request and the implementer secret stored in the implementer table. At 704, the facility performs a cryptographic signing operation on the code representation contained by the code signing request using the implementer's private key. In various examples, the facility uses a variety of cryptographic signature schemes, including the GMR (Goldwasser Micali Rivest) digital signature algorithm; an RSA PKCS (Public-Key Cryptography Standards) signature scheme; the NIST (National Institute of Standards and Technology) DSA (Digital Signature Algorithm); an ECDSA (Elliptic Curve Digital Signature Algorithm); an ElGamal signature scheme; a Rabin signature scheme; and an XML signature scheme. At 705, the facility sends a code signing result containing the signed code representation generated at 704 to the implementer client computer system. After 705, these acts conclude.

Figure 8:
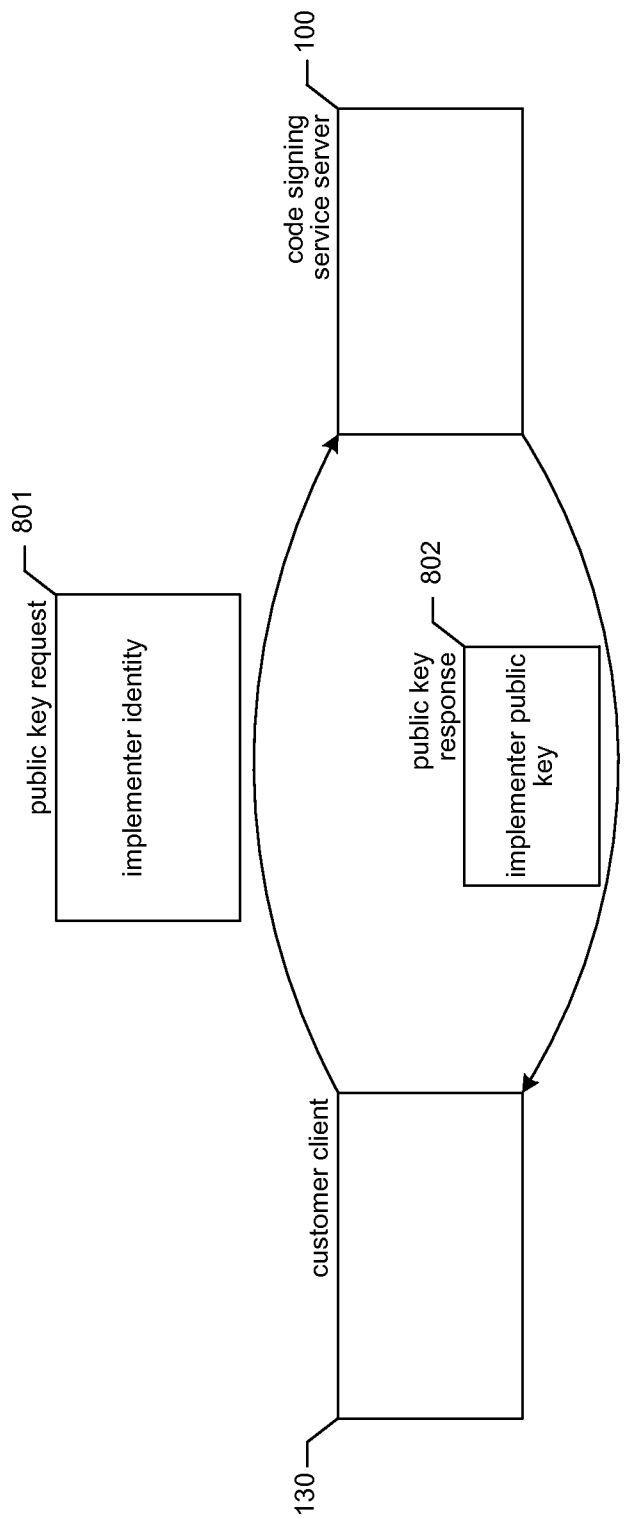
FIG. 8 is a data flow diagram showing sample interactions in accordance with the facility in some examples to provide access to implementer public keys to customers of the implementer and others.

FIG. 8 is a data flow diagram showing sample interactions in accordance with the facility in some examples to provide access to implementer public keys to customers of the implementer and others. A customer client 130 operated by a customer transmits to the code signing service server 100 a public key request 801. The public key request includes information identifying the implementer whose public key is requested. In response, the code signing service server retrieves the public key for the implementer identified by the public key request from the implementer table, and returns it to the customer client in a public key response 802.

Figure 9:
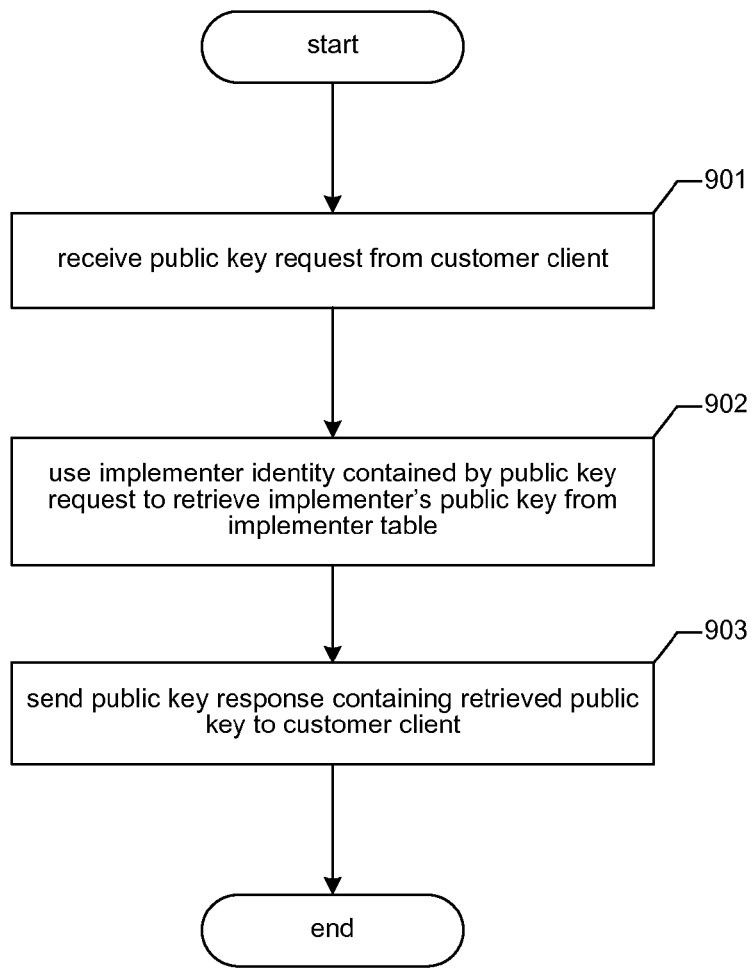
FIG. 9 is a flow diagram showing examples acts that may be performed by the facility in some examples to return a requested implementer public key.

FIG. 9 is a flow diagram showing examples acts that may be performed by the facility in some examples to return a requested implementer public key. At 901, the facility receives a public key request from a customer client, or from another computer system. At 902, the facility uses implementer identity information contained by the public key request received at 901 to retrieve the identified implementer's public key from the implementer table. At 903, the facility to the customer client a public key response that contains the public key retrieved at 902. After 903, these acts conclude.

Figure 10:
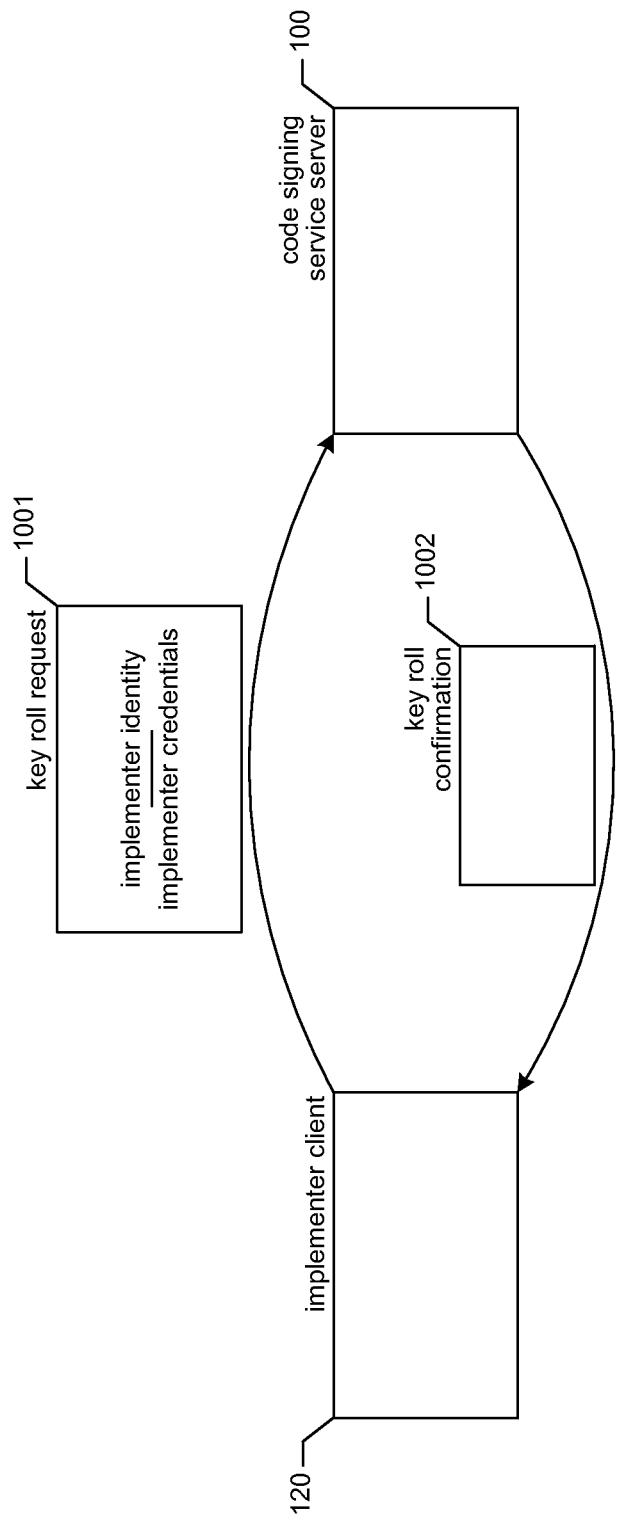
FIG. 10 is a data flow diagram showing sample interactions performed in accordance with the facility in some embodiments to change, or "roll" the key pair for an implementer.

FIG. 10 is a data flow diagram showing sample interactions performed in accordance with the facility in some embodiments to change, or "roll" the key pair for an implementer. An implementer client 120 operated by an implementer transmits to the code signing service server 100 a key roll request 1001. The key roll request includes information identifying the implementer, and credentials authenticating the implementer's identity. In response, the code signing service server generates a new key pair for the implementer based upon generating a new secret state for the implementer. To the extent that and in the way that the facility stores the members of the key pair in the implementer table, the facility replaces these with the members of the new key pair, and sends to the implementer client a key roll confirmation 1002 indicating that the key roll operation has been completed.

Figure 11:
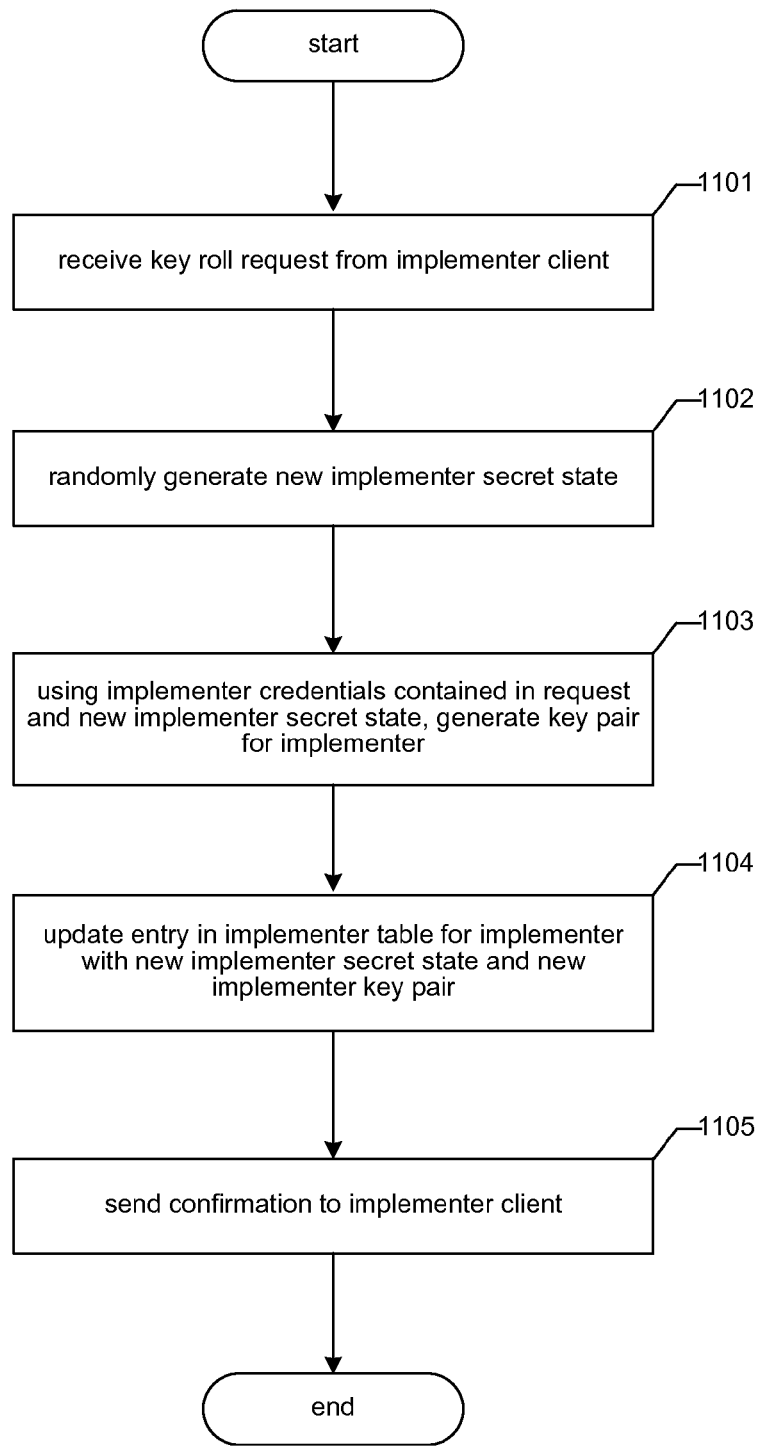
FIG. 11 is a flow diagram showing example acts that may be performed by the facility in some examples to process a key roll request.

FIG. 11 is a flow diagram showing example acts that may be performed by the facility in some examples to process a key roll request. At 1101, the facility receives a key roll request from an implementer client. At 1102, the facility randomly generates a new implementer secret state. At 1103, the facility uses implementer credentials contained in the request and the new secret state generated at 1102 to generate a new key pair for the implementer. At 1104, the facility updates the entry in the implementer table for the implementer with the new implementer secret state generated at 1102 and the new implementer key pair at 1103. At 1105, the facility sends a key roll confirmation to the implementer client indicating that the requested key roll operations has been completed. After 1105, these acts conclude.

FIG. 12 is a table diagram showing sample contents of an implementer table used by the facility in some examples after being updated in response to an implementer's key roll request. By comparing row 1201 in FIG. 12 to row 501 in FIG. 5, it can be seen that, in response to a key roll request from the Acme Utilities implementer, the facility has replaced the implementer secret state $B_1$ in column 513 of FIG. 5 with the implementer secret state $B_1'$ shown in column 1213 of FIG. 12; has replaced the implementer private key $C_1$ shown in column 514 of FIG. 5 with the implementer private key $C_1'$ shown in column 1214 of FIG. 12; and has replaced the implementer $D_1$ shown in column 515 of FIG. 5 with the implementer $D_1'$ shown in column 1215 of FIG. 12.

In some examples, the facility provides a computing system for signing software code, comprising: a communications subsystem configured to receive a representation of a body of code from a requester; and a cryptography subsystem configured to sign the representation of a body of code received by the communications subsystem using a key generated for the requester that is not accessible to the requester, the communications subsystem further configured to return to the requester the signed body of code produced by the cryptography subsystem.

In some examples, the facility provides a computer-readable medium having contents configured to cause a computing system to, in order to enroll a software implementer in a code signing service: receive information identifying the implementer; receive credentials authenticating the implementer; generate secret state for the implementer; based on at least (1) at least a portion of the received credentials and (2) at least a portion of the generated secret state, generate for the implementer a key pair comprising a private key and a public key; and persistently store the secret state.

In some examples, the facility provides a method in a computing system for enrolling a software implementer in a code signing service, the method comprising: receiving information identifying the implementer; receiving credentials authenticating the implementer; generate secret state for the implementer; based on at least (1) at least a portion of the received credentials and (2) at least a portion of the generated secret state, generating for the implementer a key pair comprising a private key and a public key; and persistently storing the secret state.

In some examples, the facility provides a computer-readable medium storing an implementer table data structure, the data structure comprising: a plurality of entries each corresponding to a software implementer, each entry comprising: a secret state maintained for the software implementer, such that the contents of the data structure are usable to generate generating a key pair for the software implementer, the key pair including a private key that is usable to sign code on behalf of the software implementer.

Figure 13:
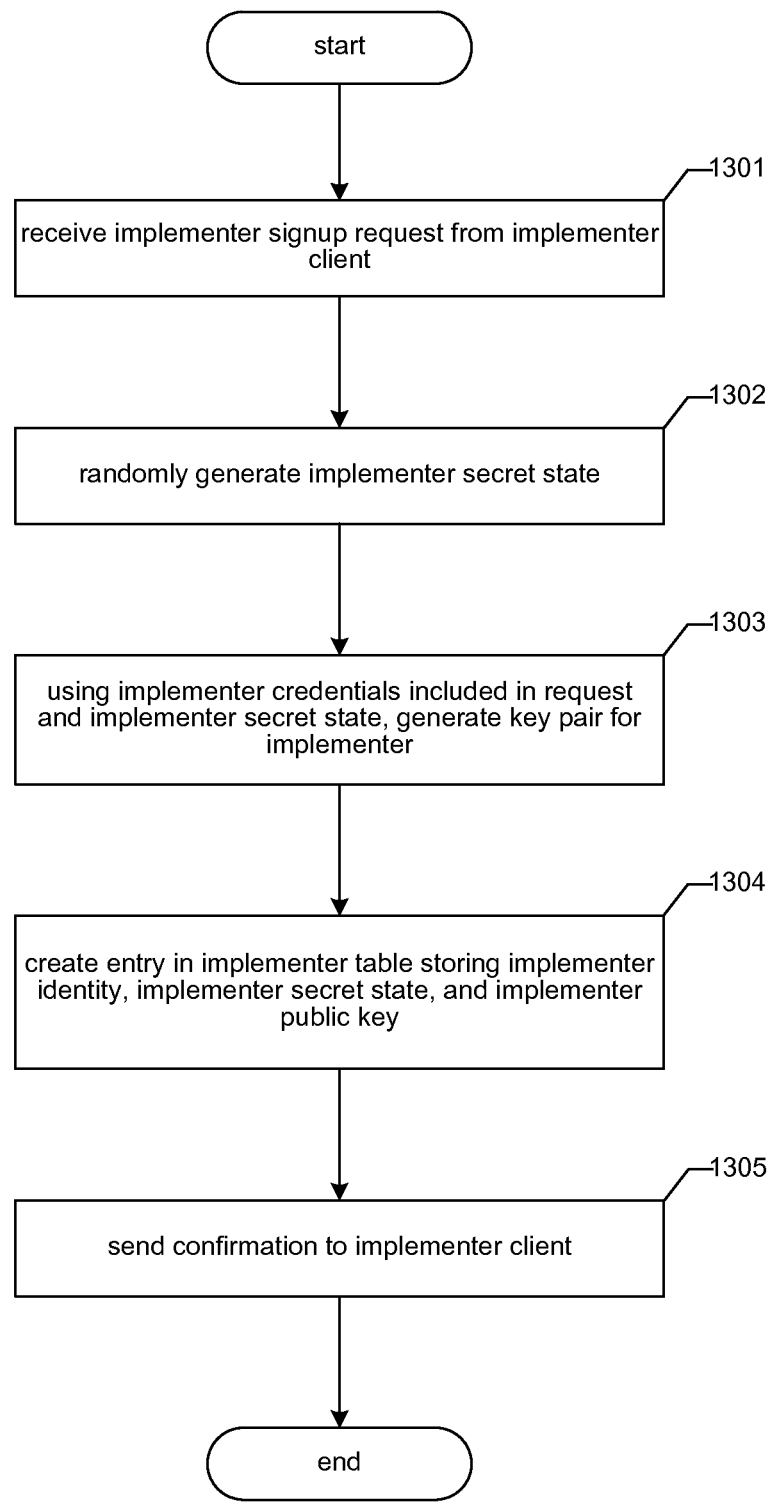
FIG. 13 is a flow diagram showing example acts that may be performed by the additional example of the facility in some examples to process a implementer signup request.
Figure 15:
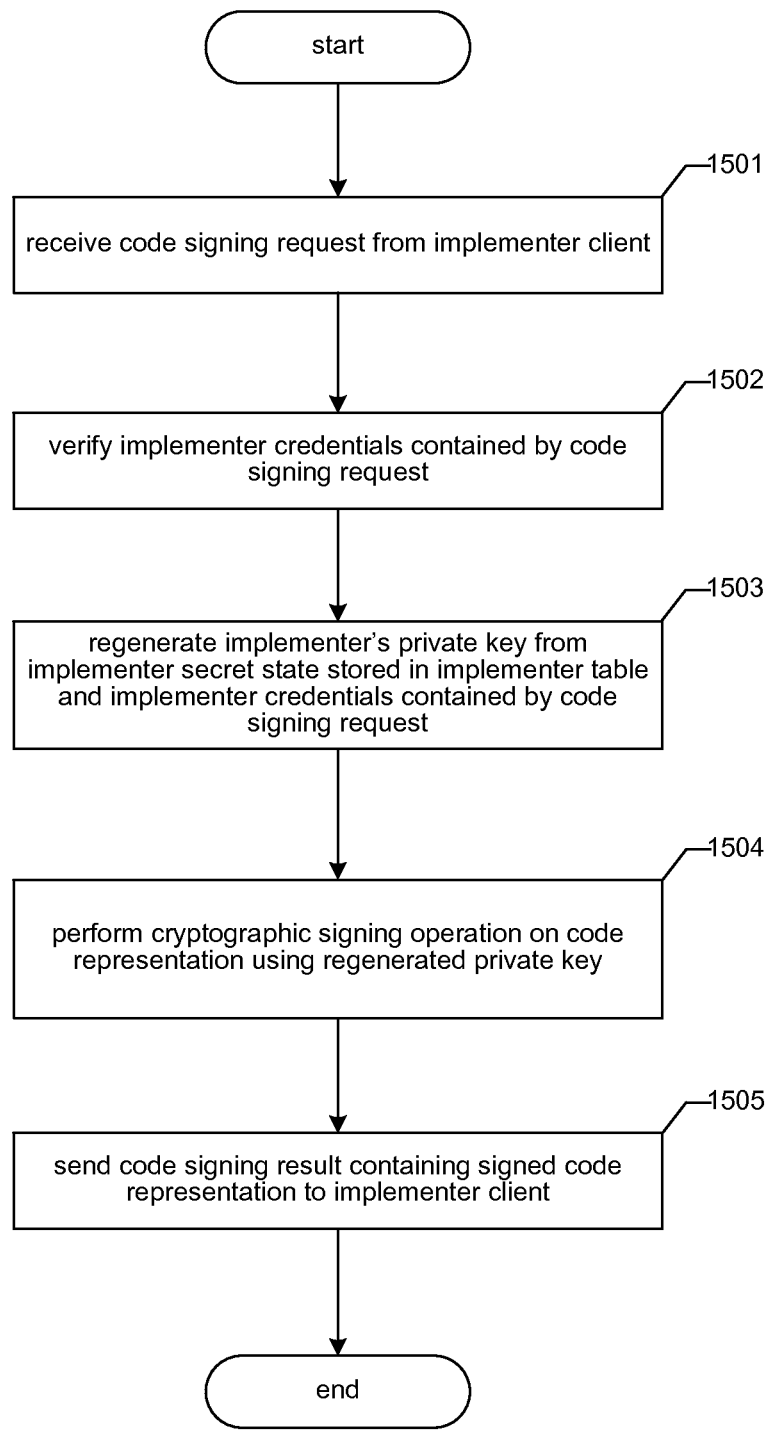
FIG. 15 is a flow diagram showing example acts that may be performed by the additional example of the facility in some examples to process a code signing request.

FIGS. 13, 14, and 15 discussed below correspond to an additional example of the facility in which neither the implementer credentials nor the implementer private key are maintained persistently by the facility; rather, each time a code signing request is received from an implementer client, containing the implementer's credentials, the facility uses those credentials together with the implementer secret state stored by the facility to regenerate that implementer's private key. The facility uses this regenerated implementer private key to sign code on the implementer's behalf. In this additional example, the facility is unable to sign code on the implementer's behalf unless the implementer participates by submitting a code signing request containing its credentials together with the code to be signed.

FIG. 13 is a flow diagram showing example acts that may be performed by the additional example of the facility in some examples to process a implementer signup request. The acts of FIG. 13 generally correspond to the acts of FIG. 4, except that at 1304, the facility creates an entry in the implementer table that stores only implementer identity, implementer secret state, and implementer public key, and not also implementer credentials and implementer private key as at 404.

FIG. 14 is a table diagram showing sample contents of an implementer table used by the additional example of the facility in some examples to store information about each registered software implementer. The acts of FIG. 14 generally correspond to those of FIG. 5, except that implementer credentials column 512 and implementer private key column 514 shown in FIG. 5 are omitted in implementer table 1400 shown in FIG. 14.

FIG. 15 is a flow diagram showing example acts that may be performed by the additional example of the facility in some examples to process a code signing request. The acts shown in FIG. 15 generally correspond to those shown in FIG. 7, except as follows: rather than retrieving the implementer's private key from the implementer table at 703 as shown in FIG. 7, at 1503, the facility regenerates the implementer's private key from the implementer secret state stored in the implementer table and the implementer credentials contained by the code signing request.

It will be appreciated by those skilled in the art that the above-described facility may be straightforwardly adapted or extended in various ways. While the foregoing description makes reference to particular examples, the scope of the invention is defined solely by the claims that follow and the elements recited therein.

We claim:

1. A computing system for signing software code, comprising:
   a processor operable to:
   store a plurality of keys in a data structure, wherein access to the plurality of keys in the data structure is controlled by a facility providing a service to a plurality of implementer organizations, and wherein the plurality of keys are stored with information identifying the plurality of implementer organizations;
   receive information identifying an implementer organization in the plurality of implementer organizations and a request to sign a representation of a body of code from the implementer organization;
   use the received information identifying the implementer organization to retrieve a key in the plurality of keys from the data structure that has corresponding stored information identifying the implementer organization;
   use the key to sign the representation of the body of code from the implementer organization; and
   return to the implementer organization the signed representation of the body of code.

2. The computing system of claim 1, further comprising: a storage device configured to store the plurality of keys that are stored with information identifying the plurality of implementer organizations.

3. The computing system of claim 1 wherein the cryptography subsystem is further configured to generate the key that is stored with information identifying the implementer organization.

4. The computing system of claim 1 wherein the key that is stored with information identifying the implementer organization is generated based at least in part on receipt of the representation of the body of code.

5. The computing system of claim 1 further operable to:
   receive credentials from the implementer organization that authenticate the implementer organization's identity, and
   generate the key being maintained for the implementer organization at least in part based upon at least a portion of the received credentials.

6. The computing system of claim 5, further comprising:
   a storage device configured to store a secret state generated for the implementer organization,
   and the processor is further operable to generate the key that is stored with information identifying the implementer organization at least in part based upon the secret state stored by the storage device.

7. The computing system of claim 1 wherein the key used to sign the representation of the body of code is a private key having a corresponding public key,
   the computing system further operable to:
   publish the public key.

8. A memory having contents configured to cause a computing system to, in order to enroll a software implementer organization in a code signing service:
   receive information identifying the implementer organization;
   receive credentials authenticating the implementer organization;
   generate a secret state for the implementer organization;
   based on at least (1) at least a portion of the received credentials and (2) at least a portion of the generated secret state, generate a key pair comprising a private key and a public key;
   persistently store the secret state with information identifying the implementer organization to maintain the secret state in a data structure, and wherein access to the secret state in the data structure is controlled by a facility providing a service to a plurality of implementer organizations;
   receive information identifying an implementer organization in the plurality of implementer organizations and a request to sign a representation of a body of code from the implementer organization;
   use the received information identifying the implementer organization to identify the private key; and
   return a cryptographically signed representation of the body of code using the private key.

9. The memory of claim 8 wherein the memory has contents further configured to cause the computing system to:
   after persistently storing the secret state:
   receive credentials authenticating the implementer;
   receive the representation of the body of code; and
   retrieve the private key from the plurality of private keys using the information identifying the implementer organization.

10. The memory of claim 9 wherein the body of code is not derivable from the representation of the body of code.

11. The memory of claim 9 wherein the memory has contents further configured to cause the computing system to:
   persistently store the private key of the generated key pair with a plurality of private keys from other implementer organizations; and after receiving the representation of the body of code, retrieve the persistently stored private key of the generated key pair from the plurality of keys, and wherein the retrieved private key of the generated key pair is used to cryptographically sign the received representation of the body of code.

12. The memory of claim 9 wherein the memory has contents further configured to cause the computing system to:

after receiving the representation of the body of code, based on at least (1) at least the portion of the received credentials and (2) at least the portion of the generated secret state, regenerate for the implementer organization a key pair comprising a private key and a public key, and wherein the regenerated private key of the generated key pair is used to cryptographically sign the received representation of the body of code.

13. The memory of claim 8 wherein the memory has contents further configured to cause the computing system to:

after persistently storing the secret state:
receive credentials authenticating the implementer organization;
receive an instruction to replace the generated key pair;
based at least in part upon receiving the instruction:
generate a new secret state for the implementer organization;
based on at least (1) at least the portion of the received credentials and (2) at least the portion of the new generated secret state, generate for the implementer organization a new key pair comprising a private key and a public key; and
persistently store the new secret state.

14. The memory of claim 8 wherein the memory has contents further configured to cause the computing system to publish the public key of the generated key pair in connection with information identifying the implementer organization.

15. The memory of claim 8 wherein the memory has contents further configured to cause the computing system to:

persistently store the public key of the generated key pair in connection with information identifying the implementer organization; and
responding to unauthenticated requests containing information identifying the implementer organization with the stored public key.

16. A memory storing an implementer table data structure, the data structure comprising:

a plurality of entries each including information identifying an implementer organization in a plurality of implementer organizations, each entry comprising:
a secret state identifying a software implementer organization in the plurality of software implementers, wherein access to the secret state in the data structure is controlled by a facility providing a service to a plurality of implementer organizations,
wherein the contents from an entry of the data structure are usable to generate a key pair for the software implementer organization, the key pair including a private key that is usable to sign code on behalf of the software implementer organization, and
wherein received information identifying the implementer organization is used to retrieve the contents from the entry that has corresponding stored information identifying the implementer organization.

17. The memory of claim 16 wherein the key pair includes a public key corresponding to the private key, and wherein each entry further comprises:

the public key of the key pair generated for the software implementer organization.

18. The memory of claim 16 wherein each entry further comprises:

the private key of the key pair generated for the software implementer organization.

19. The computing system of claim 1, wherein:

the plurality of keys are encrypted with credentials for respective implementer organizations; and
credentials for the implementer organization are used to decrypt the key.

20. A method for signing software code, the method comprising:

storing, by a computing device, a plurality of keys in a data structure, wherein access to the plurality of keys in the data structure is controlled by a facility providing a service to a plurality of implementer organizations, and wherein the plurality of keys are stored with information identifying the plurality of implementer organizations;
receiving, by the computing device, information identifying an implementer organization in the plurality of implementer organizations and a request to sign a representation of a body of code from the implementer organization;
using, by the computing device, the received information identifying the implementer organization to retrieve a key in the plurality of keys from the data structure that has corresponding stored information identifying the implementer organization;
using, by the computing device, the key to sign the representation of the body of code from the implementer organization; and
returning, by the computing device, to the implementer organization the signed representation of the body of code.

21. The method of claim 20 further comprising:

storing the plurality of keys that are stored with information identifying the plurality of implementer organizations.

22. The method of claim 20 further comprising:

storing the key that is stored with information identifying the implementer organization.

23. The method of claim 20 wherein the key that is stored with information identifying the implementer organization is generated based at least in part on receipt of the representation of the body of code.

24. The method of claim 20 further comprising:

receiving credentials from the implementer organization that authenticate the implementer organization's identity, and
generating the key being maintained for the implementer organization at least in part based upon at least a portion of the received credentials.

25. The method of claim 24, further comprising:

storing a secret state generated for the implementer organization; and
generating the key that is stored with information identifying the implementer organization at least in part based upon the secret state.

26. The method of claim 20 wherein the key used to sign the representation of the body of code is a private key having a corresponding public key, the method further comprising:
 publishing the public key.

\* \* \* \* \*